United States Patent [19]

Benefield et al.

[11] 4,318,653
[45] Mar. 9, 1982

[54] HAY LOADER

[76] Inventors: William F. Benefield; Elmer D. Larkin, both of Rte. 1, Cooper, Tex. 75432

[21] Appl. No.: 91,527

[22] Filed: Nov. 5, 1979

[51] Int. Cl.³ .......................... A01D 87/12; B60P 1/16
[52] U.S. Cl. ..................................... 414/24.5; 414/703
[58] Field of Search ..................... 414/24.5, 24.6, 680, 414/684, 700, 703, 706, 707, 710, 711, 714, 716, 721, 911, 917, 704, 743

[56] References Cited

U.S. PATENT DOCUMENTS

| | | | |
|---|---|---|---|
| 2,397,046 | 3/1946 | Richey | 414/703 |
| 2,624,481 | 1/1953 | Richey | 414/703 |
| 2,731,161 | 1/1956 | Carstens | 414/703 |
| 4,015,739 | 4/1977 | Cox | 414/703 |
| 4,120,405 | 10/1978 | Jones et al. | 414/24.5 |

FOREIGN PATENT DOCUMENTS

| | | | |
|---|---|---|---|
| 1264024 | 5/1961 | France | 414/703 |
| 663948 | 1/1952 | United Kingdom | 414/703 |
| 711813 | 7/1954 | United Kingdom | 414/703 |

Primary Examiner—Leslie J. Paperner
Attorney, Agent, or Firm—Thomas L. Cantrell; Joseph H. Schley

[57] ABSTRACT

This invention relates to a device for the lifting, loading, and transportation of large cylindrical hay bales that is well suited for the loading and unloading of the elevated surfaces commonly encountered in storing or shipping operations. The device is easily attached and removed from a standard tractor's three point hitch system and is wholly actuated by the hydraulic system and controls therein. An implement mounting plate is attached to the top hitch point. Two extension bars extend rearwardly and outwardly from the implement mounting plate to which they are pivotally connected. The upper extension bar is pivotally supported by uprights extending from the drawbar which is pivotally connected between the lower hitch points and through this arrangement lift is selectively imparted from the tractor hydraulic system to the loading device extension. The extension bars terminate at a pivotal connection to the spear mounting plate from which the spear protrudes. In operation, the tractor is backed up with the mounted device in a lowered position to impale a bale upon the spear. The tractor's hydraulic system is then used to raise the bale. The bar system of the device tilts the spear slightly upward as the extension is raised, securing the placement of the bale. The tractor then carries the bale to the desired location where it is lowered and the spear withdrawn.

4 Claims, 8 Drawing Figures

HAY LOADER

BACKGROUND OF THE INVENTION

The rapid acceptance of forming hay into large cylindrical bales has not been matched with complementary development of means for the lifting, loading, or transportation of the bale so produced. This is of particular consequence because, depending upon the type of grass baled, cylindrical bales may weight between 1000 and 2000 pounds green and remain even as heavy as 1500 pounds when dry. Further, medium sized cylindrical bales typically range approximately five feet in diameter and approximately five feet in length. At this bulk and weight, prior practices of loading the baled hay by hand onto trucks or trailers are no longer practical.

The most popular expedient making use of common, currently available equipment is to employ a front end loader attachment mounted on a tractor. However, such systems require their own independent hydraulic and control systems, are time consuming to both mount and remove, and create frequent maintenance demands. Further drawbacks to the use of front end loaders as applied to loading and unloading of hay bales are that they are not standard equipment on the majority of farms and that a special procurement towards this use proves an expensive solution, both as to purchase and maintenance. Furthermore, agricultural tractors are not ordinarily designed to be heavily loaded at the front; they are usually much stronger at the rear.

In addition, several special handling devices have been developed, but none combines the simplicity, convenience and versatility necessary to effect a satisfactory solution.

The Nelson hay loading device disclosed in U.S. Pat. No. 2,954,886 is a fairly complex tractor mounted apparatus which teaches the use of gripping jaws to engage a bale and a hydraulically actuated swinging extension to rotate the bale from a position beside the tractor to an elevated position from which the bale may be dropped onto an elevated surface behind the tractor. The apparatus is not suitable for conveniently unloading hay bales from an elevated surface, nor for applications requiring more careful placement than the "dropping" operation allows. The operation contemplated by Nelson requires an independent hydraulic system operating from a rigid, stationary hitch and the resulting design is not adaptable to a configuration that is readily attachable to a standard, hydraulically actuated three point hitch.

Cox, in U.S. Pat. Nos. 4,099,629 and 4,015,739, discloses a hay bale handling machine, including one configuration to be mounted on a tractor. His primary disclosure is of a device that may be mounted into the bed of a pickup truck. This pickup truck apparatus uses an extended spear to impale a bale of hay and then pivots the immediate upright member from which the spear protrudes until the spear is essentially vertical at which point the bale is in a cylindrically upright position, resting over the truck bed upon the previously upright and now horizontal spear carring member. This configuration does not allow either loading or unloading hay bales upon any appreciably elevated surface. The disclosures also contain a configuration for mounting the spear upon a three point hitch behind a tractor, but again the device is not appropriate to work with elevated storage or transportation surfaces. The spear is mounted upon an upright post which is directly attached to the three point hitch system. The top of the post is attached through a top support arm to the upper hitch point of the tractor. The bottom of the post is shown permanently affixed to a drawbar disposed between the lower hitch members. Both the top support arm and the drawbar are standard means for attaching implements to a three point hitch and neither is directly adaptable for mounting the post and spear in a configuration that allows loading or unloading from elevated surfaces. Rather it is the object of Cox to engage and tilt the bale for transportation only upon the spear or spike itself, and not for loading to or unloading from elevated surfaces.

The identical failings are present in the Jones disclosure for U.S. Pat. No. 4,120,405. Indeed, here the inadequacies of the three point hitch configuration seems to be conceded as this system is discussed anciliary to a front end loader adaptation for handling hay bales. But even as adapted, the front end loader retains the inadequacies discussed in the preceding for standard, commercially available front end loaders.

The tractor mounted embodiment of McFarland's U.S. Pat. No. 4,084,707 is primarily of interest in unrolling hay bales, though it may be used for transport in the same sense as the Cox device. However, it too is fundamentally lacking for the immediate application.

Further, while various elevating extension schemes have been developed to be mounted upon a tractor's three point hitch, none is appropriate for the contemplated use.

A shovel device is disclosed by U.S. Pat. No. 4,068,774, however Howell's apparatus is not adaptable because it teaches a single extension bar device. Such a one-bar system could not produce an appropriate tilt of an engagement spear.

The Larsen device, under U.S. Pat. No. 2,311,671 shows a manure loader. This device includes complications which were appropriate to facilitate a dumping action, but are not appropriate for a hay bale loading machine where dumping is not contemplated. Further, the structural bar system itself disposes a lower bar so low as to unduly limit an approach to an elevated platform.

The Holopainen ditch digging device disclosed in U.S. Pat. No. 2,496,874 is an inappropriate elevating extension in the present application for the same reasons as Larsen. In addition, the Holopainen system calls for auxiliary hydraulic systems.

SUMMARY OF THE INVENTION

In accordance with the present invention there is provided a simple, low maintenance, inexpensive and convenient device for the handling and transportation of cylindrical hay bales. Further, the handling capabilities of this device include the ability to load onto and unload from elevated transportation or storage surfaces such as truck beds, trailers, railroad cars, elevated platforms, etc. The device is easily attached to the three point hitch currently existing on many tractors. When mounted, the device is wholly actuated by the hydraulics and controls inherent in the tractor's hitch system. Two bars extend from the implement mounting plate of the device which is rigidly attached to the top hitch point of the tractor. These extension bars are vertically disposed and pivotal within a vertical plane extending rearwardly from the tractor's hitch system. The upper extension bar is further supported by uprights which transmit the movement of the drawbar which is affixed between the two hydraulically actuated lower hitch points. Both bars extend past the uprights and terminates into the spear mounting plate. A spear-like extension adapted to impale a bale of hay protrudes from the far side of the spear mounting plate.

When the swing arms which terminate at the lower hitch points are lowered by the hydraulic system in the tractor, the upper bar pivots at the implement mounting plate as it is supported by uprights attached to the drawbar which is affixed between the hydraulically actuated hitch points. The upper extension bar then lowers the spear mounting plate to which it attaches and to which the lower extension bar is attached. As the spear mounting plate descends the lower extension bar swings down, similarly pivoting at the implement mounting plate. The spear is lowered to a position that is approximately horizontal and at an appropriate elevation, near or slightly above the center of gravity, to impale the bale of hay. The hay bale is engaged by backing the tractor up until the spear is fully inserted to its base at the spear mounting plate.

The impaled bale may be lifted by hydraulically raising the swing arms. Again, the extension bars pivot at the implement mounting plate which is attached to the tractor at the top hitch point. As the extension bars are lifted through an arc, the spear mounting plate tilts back so as to incline the extended spear. A hay bale impaled upon the spear will tend to slide to a stable position resting against the spear mounting plate as the extension bars are raised and the spear is tilted rearwardly upward. The tractor can then transport the elevated bale to a position above the desired location. The bale is then lowered into position using mechanics similar to those used to raise the bale. Once the bale is settled onto the desired surface, the tractor is driven away and this withdraws the spear. In this manner cylindrical bales may be moved from the field, onto and off of various transportation devices including trailers, railroad cars, and truck beds as well as into and out of storage facilities such as barns.

DESCRIPTION OF THE DRAWINGS

FIG. 5 is a fragmentary side elevation view of the device mounted on a tractor's three point hitch illustrating on operational approach to a hay bale.

FIG. 6 is a fragmentary side elevation view of the device mounted on a tractor's three point hitch illustrating engagement of the device with a bale of hay.

FIG. 7 is a fragmentary side elevation view of the device mounted on a tractor's three point hitch illustrating the device starting to lift a bale of hay.

FIG. 8 is a fragmentary side elevation view of the device mounted on a tractor's three point hitch illustrating the device lifting a bale of hay to an appreciable elevation.

DESCRIPTION OF THE PREFERRED EMBODIMENTS

Figure 1:
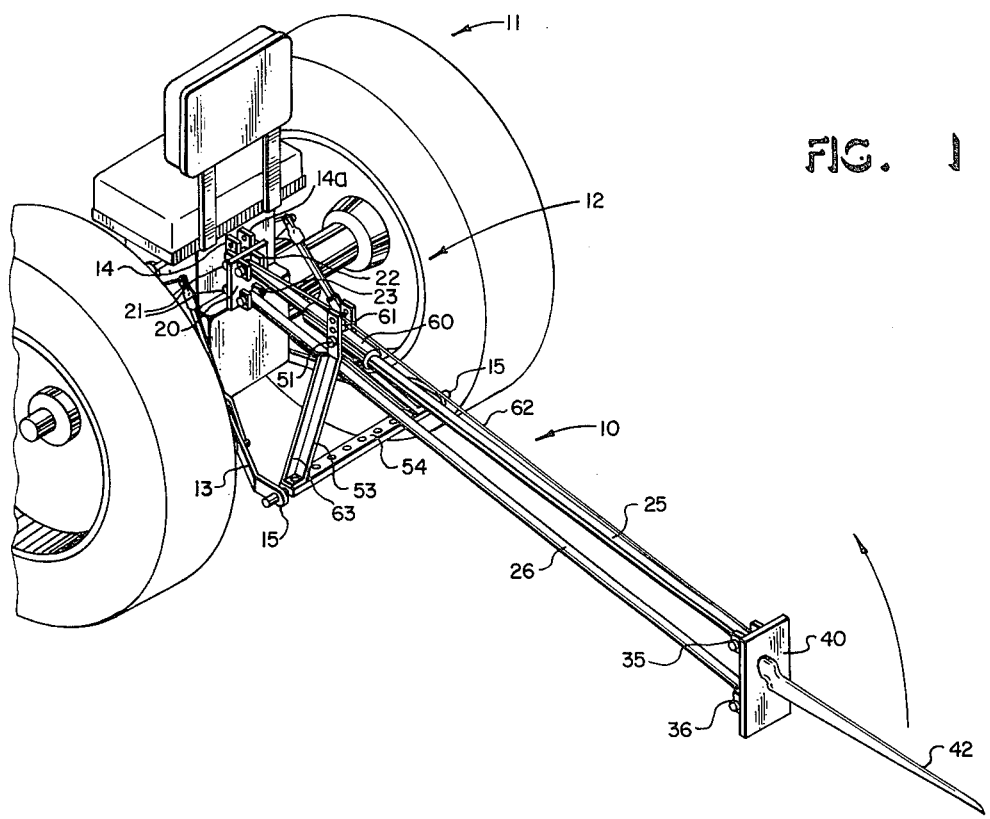
FIG. 1 is a fragmentary perspective view of a cylindrical hay bale handling device constructed in accordance with the invention and mounted on a tractor's three point hitch.

In the drawings, the apparatus of the invention is designated generally as 10. Said apparatus attaches to tractor 11 by means of a three point hitch 12 comprising two lower hitch points 15 which are positioned on the extended ends of the swing arms 13 and a top hitch point 14 which is fixed in relation to the tractor. See FIG. 1.

Figure 4:
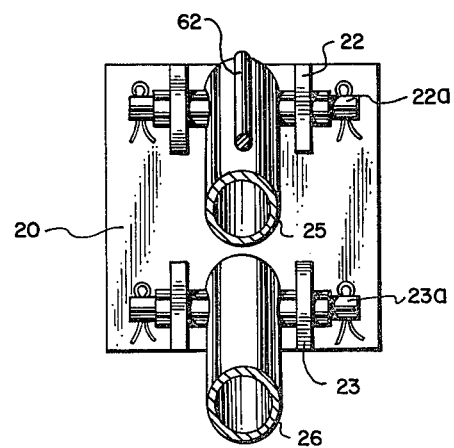
FIG. 4 is a cross sectional view taken along line 4—4 of FIG. 2.

An implement mounting plate 20 is rigidly attached to the top hitch point 14 by pins or bolts 21. The outward face of the mounting plate (that is the side which faces away from the tractor), has a pair of vertically disposed pillows blocks 22 and 23, each oriented so as to provide for a vertically pivotal connection. Upper and lower extension bars, 25 and 26 respectively, are pivotally attached to the pillow blocks 22 and 23 through corresponding pin and bushing arrangements 22a and 23a, respectively. See FIG. 4. The extension bars 25 and 26 extend outwardly and rearwardly to terminate in pillow blocks 35 and 36 where the extension bars are pivotally affixed within a vertical plane to the spear mounting plate 40 using such means as was used at the implement mounting plate.

The exact configuration of the top hitch point 14 may vary from manufacturer to manufacturer and from model to model, and these changes may require corresponding modification in the tractor engaging face of the implement mounting plate 20 or, in the extreme, may allow deletion of the implement mounting plate altogether with both the upper and lower extension bars pivotally connected directly into the top hitch point. Flexibility enabling use of the device with the widest range of tractor models is also promoted by providing a range of holes in upright 53 allowing adjustable upper bar attachment.

Typically, the tractor's upper top point 14 is formed from two vertical, perforated rails, such as 14a, creating a channel between to which a point from an implement may be pivotally fastened. The top hitch configuration can best be seen in FIG. 1. However, the present application requires rigid attachment of the implement mounting plate 20 to the tractor 11. Thus use of two vertically disposed pins 21, is preferred as it prevents the pivotal freedom of the implement mounting plate. Further, if the implement mounting plate engages the hitch point as the female in the coupling, additional lateral stability is achieved. It is preferred to also enhance lateral stability by use of various standard commercially available packages to stabilize the three point hitch.

The spear mounting plate 40 has an outward face from which a spear-like projection 42 protrudes.

Figure 3:
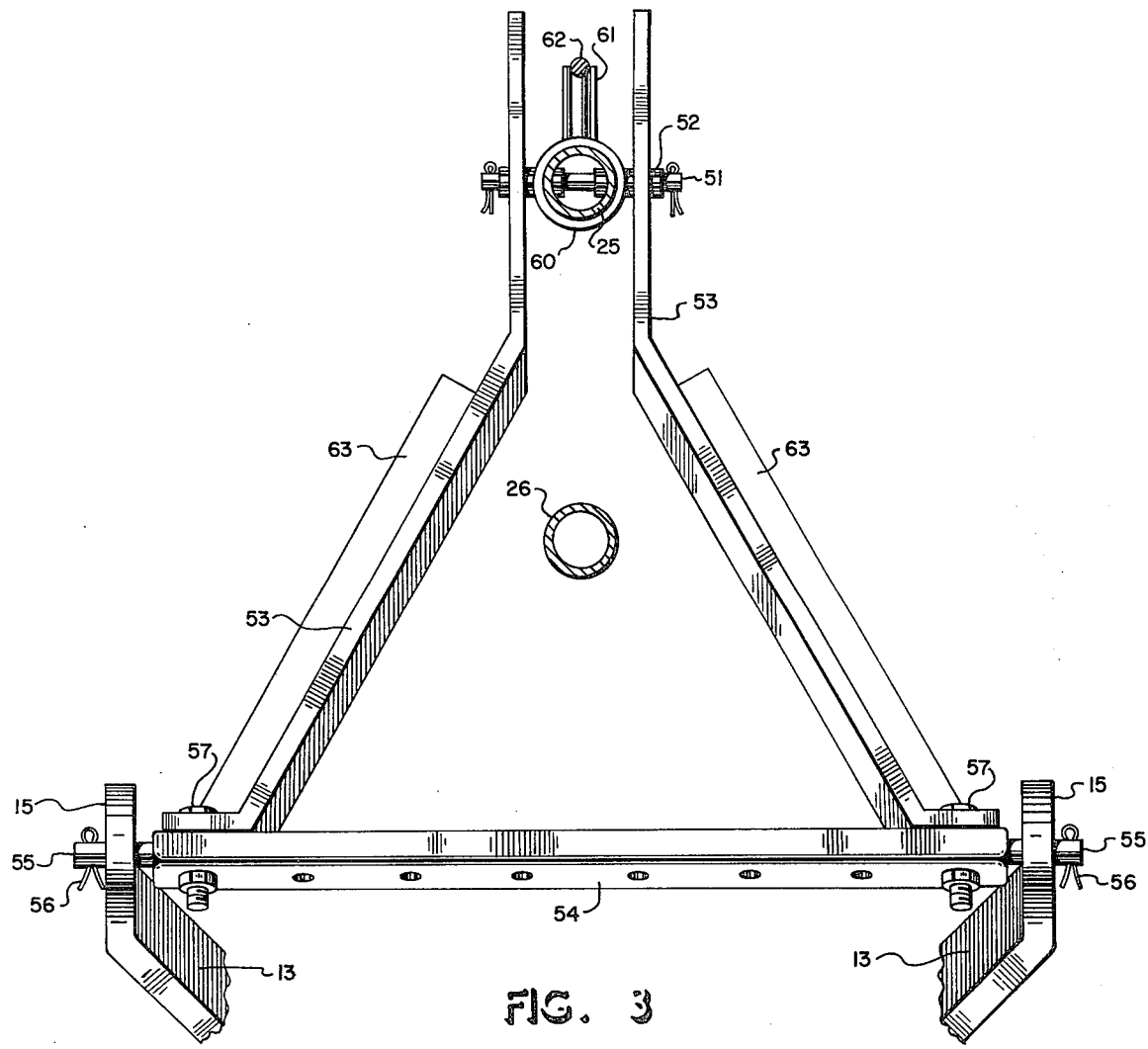
FIG. 3 is a cross sectional view taken along line 3—3 of FIG. 2.

At some point between the implement mounting plate and the spear mounting plate a pin 51 and bushing 52 serves to pivotally attach the upper extension bar to uprights 53. The uprights 53 attach to a pivotal drawbar 54 which is attached at either end through said lower hitch points 15 and is attached there by pivotal pins 55 and secured by removable pin means 56. The uprights-to-drawbar connection may either be of a permanent nature or, as illustrated in FIG. 3, a temporary attachment effected by such means as a nut and bolt arrangement 57.

Figure 2:
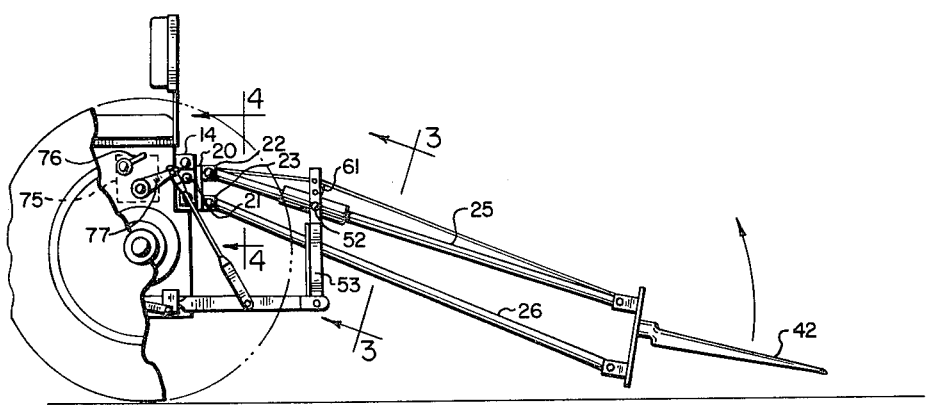
FIG. 2 is a fragmentary side elevation view of the device mounted on a tractor's three point hitch.
Figure 5:
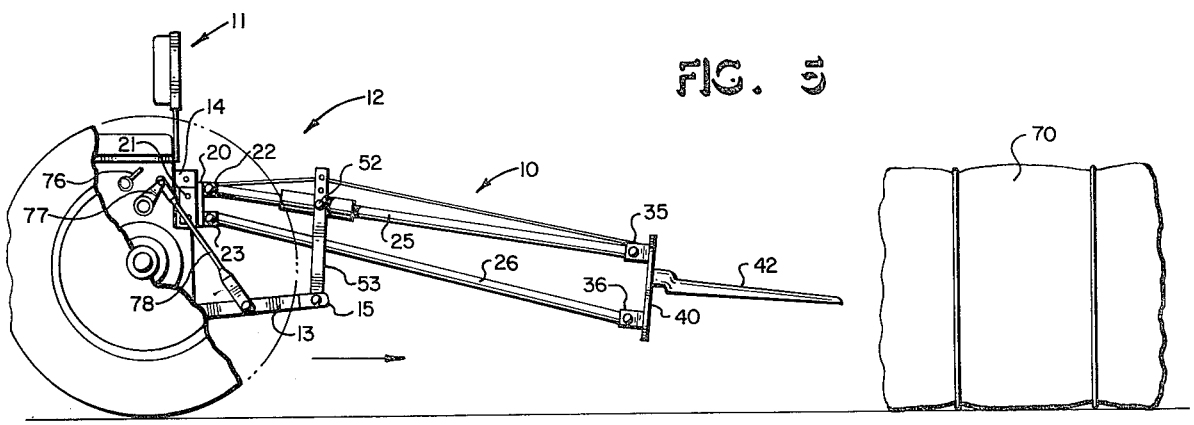
FIGS. 5 through 8 form a "movie" illustrating operation of the device.
Figure 6:
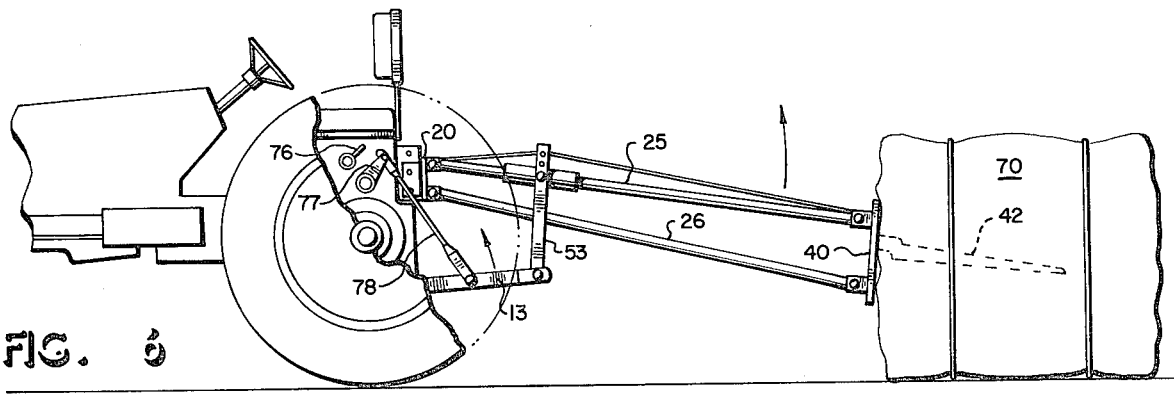
Figure 7:
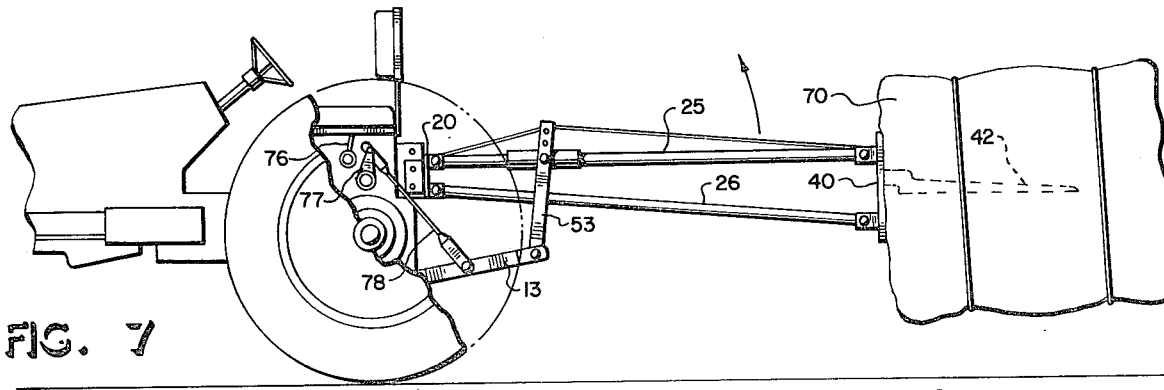
Figure 8:
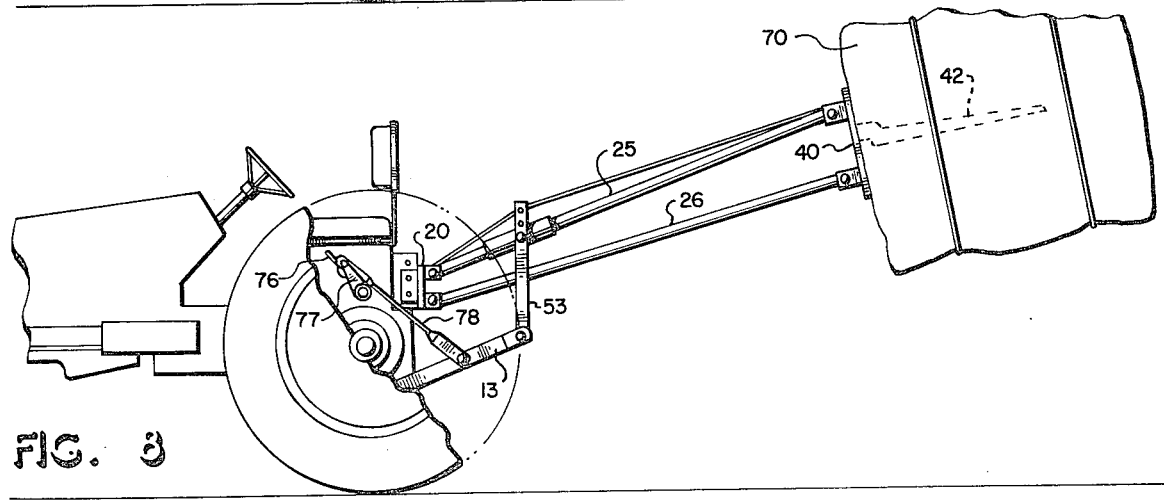

The operation of the device is best illustrated by FIG'S. 5 through 8. As shown in FIG. 5, with device 10 in a lowered position, the spear 42 will project essentially horizontally with the ground and in line with the extension of the device. The tractor 11 backs the device up to a chosen cylindrical bale 70 and further backing will impale the bale upon said spear 42. The spear should be positioned to impale said bale on the cylindrical end, either centrally or slightly above the center of gravity and should be fully inserted until the rearward face of the spear mounting plate 42 is in contact with said bale. See FIG. 6. A hydraulic system 75 inherent in the tractor, (See FIG. 2) and controlled through lever 76 raises lift arms 77 and thereby raises tension rods 78 which pull up swing arms 13. The swing arms in turn lift uprights 53 which support the upper extension bar 25 as depicted in FIG'S. 7 and 8.

It is preferred that after engaging the bale 70 that the spear slightly slant rearwardly upward as the extension is lifted. This tilting secures the bale's engagement upon the spear by promoting its sliding into the spear mounting plate which further supports the bale. This effect may be achieved without addition of any auxiliary devices by an appropriate configuration of the extension bars 25 and 26 and the mounting plates 20 and 40. Such a bar system must provide for tilting the spear 42, yet not limit itself by interference between the upper bar 25 which is pinned to the uprights 53 and the lower bar 26 which moves freely from the implement mounting plate 20 to the spear mounting plate 40 at its other end. The approach illustrated herein is to use bars 25 and 26 of equal length, but not parallel. As illustrated in FIGS. 5 through 8 the bars 25 and 26 diverge as they extend from the implement mounting plate 20. This particular configuration, in conjunction with a vertical implement mounting plate 20, and in association with matched pairs of pillow blocks 22 and 23; 35 and 36, produces a system that projects a spear that is horizontal in the engagement elevation and appropriately tilted in the lifted or transport position.

A properly engaged and lifted bale may be transported to a location over the desired position by driving the tractor 11. There the tractor's hydraulic system 75 is used to lower the bale into position using the same mechanics described in raising the bale. The spear is then disengaged by driving the tractor away. Depending upon the elevation and chosen bar configuration, it may be helpful to lower the hydraulic system slightly below the point at which the bale rests on the desired surface.

Ease in attachment and disengagement is promoted by the lightest device with sufficient strength for the application. The preferred embodiment uses several means to minimize weight so as to promote easy attachment yet maintain strength where required. To this end uprights 53 are strengthened by reinforcements 63 and upper extension bar 25 is reinforced with collar 60 in the region where the pin 51 and bushing 52 pass through it. In addition the upper extension bar which is predominantly a tension member in the bar system is strengthened by a reinforcing rod 62 affixed to either end of the upper bar and passing across strut 61 which transfers the load to the collar and thereby through the upright.

I claim:

1. A hay handling apparatus for engaging and lifting cylindrical bales of hay, for attachment to and cooperation with the three point hitch system of a tractor, said hitch system being of the kind having a first implement attachment point or top hitch point located relatively high on the back end of the tractor, and second and third implement attachment points or lower hitch points each located on the end of a swing arm extending rearwardly from the back end of the tractor and selectively movable by power means provided in said tractor to different elevations, and a horizontally extending draw bar pivotally connected at its ends between said lower hitch points, said apparatus comprising:

two rigid continuous extension bars extending outwardly and rearwardly from said tractor, each pivotally attached by vertically pivotal means to said top hitch point, said extension bars being disposed on said top hitch point, one above the other;

two upright columns, one extending upwardly from each end of said drawbar;

attachment means pivotally attaching the upper of said extension bars to an elevated position upon said uprights;

a spear mounting plate pivotally attached to the outwardly extended ends of said extension bars;

a spear projecting from the outwardly facing surface of said spear mounting plate;

the lower extension bar being unattached to said uprights and thus freely movable between between said top hitch point and said spear mounting plate; and said rigidity and continuity of said extension bars, and said pivotal attachments to said bars acting together to apply lifting forces to said spear through the upper extension bar and to control orientation of said spear during raising and lowering thereof;

whereby upon translation of said tractor, said spear may be inserted into or removed from a hay bale, and upon elevation and depression of said lower hitch points by said power means, the hay bale may be lifted and lowered.

2. A hay handling apparatus in accordance with claim 1 wherein said vertically pivotal means attaching said extension bars to said top hitch point comprises:

an implement mounting plate rigidly attached to said top hitch point;

two vertically disposed pillow blocks affixed to the outward face of said implement mounting plate; and second attachment means pivotally connecting said extension bars to said pillow block.

3. A hay handling apparatus in accordance with claim 1 wherein:

said spear projects perpendicularly from said spear mounting plate;

said vertical pivotal attachment means connecting said extension bars to said upper hitch point are in substantially vertical alignment;

said extension bars are non-parallel to each other and diverge outwardly toward said spear mounting plate;

said extension bars are attached to said spear mounting plate at vertically spaced points thereon, the spacing of said points being selected to provide a substantially vertical spear mounting plate and thus a corresponding horizontal orientation of the said spear in its lowered position, and a downwardly outward slope to said spear mounting plate when said extension bars are in a raised position, thereby tilting said spear outwardly and upwardly to offset any tendency of said spear to droop under load, and to thus prevent said bale from sliding off said spear.

4. A hay handling apparatus in accordance with claim 3 wherein said extension bars are of substantially equal length.

* * * * *